July 21, 1964 B. BERNSTEIN 3,142,000
MATRIX FOR HOLDING AND MAKING ELECTRICAL CONNECTION
WITH A PLURALITY OF ELECTRICAL UNITS
Filed Feb. 15, 1961

INVENTOR.
BERNARD BERNSTEIN

BY James and Franklin

ATTORNEYS

3,142,000
MATRIX FOR HOLDING AND MAKING ELECTRICAL CONNECTION WITH A PLURALITY OF ELECTRICAL UNITS

Bernard Bernstein, Brooklyn, N.Y., assignor to Radio Receptor Company, Inc., Brooklyn, N.Y., a corporation of New York
Filed Feb. 15, 1961, Ser. No. 89,529
13 Claims. (Cl. 317—101)

The present invention relates to a structure providing for the mounting and protection of a plurality of individual electrical units such as selenium rectifier pellets in such a way as to facilitate the making of electrical connections thereto.

Many types of apparatus involving electrical circuitry call for the circuit connection of a plurality of individual electrical units. It is a matter of great convenience, particularly where the units are quite small in size, to utilize a single structural assembly in which that plurality of individual units is mounted. Circuit design often requires that the individual electrical units be connected in parallel, one terminal of each of the units having a common connection and the other terminal of each of the units being connected respectively into different circuits. In addition, particularly when the overall apparatus is to be subjected to adverse ambient conditions when in use and when the electrical units are more or less susceptible to such conditions, it is desirable that those units be protected by being encapsulated or "potted" within a covering of protective plastic material.

Various structural arrangements have been proposed in the past for accomplishing these results. The structural arrangement of the present invention has the advantage, when compared with prior art structures of the same type, of simplicity and inexpensiveness while at the same time providing for securing the individual units in place, making electrical connections thereto, and protecting them against adverse external influences, all in an exceptionally positive, reliable and effective manner.

The simplicity of the structure of the present invention derives in part from the fact that it is composed of a limited number of structurally simple and easily manufactured parts which may assume a standard form capable of use in a wide variety of different circuit applications. These parts comprise a standard type of housing, a plurality of identical simple connection elements, one for each of the electrical units, a conductive and preferably resilient strip common to a plurality of the electrical units and, when desired, a casing within which the housing and assembled parts is adapted to be received. None of these parts require any degree of precision in their manufacture. The inexpensiveness and simplicity of the structure of the present invention further derives from the fact that the parts of the assembly so cooperate with one another that some of the same parts which serve to retain the individual electrical units in position also serve to provide for effective electrical connection thereto. Furthermore, the parts so cooperate that the overall assembly of the several parts, including the individual electrical units, is accomplished merely by placing the various parts in position. Thus inexpensiveness is achieved not only by reason of the low cost of the parts themselves but also because the assembly of the parts may be readily and rapidly accomplished even by unskilled personnel.

Broadly considered, the assembly comprises a housing having a plurality of recesses into which the individual electrical units are adapted to be received. These recesses also receive individual connection elements adapted to be operatively engaged by the respective electrical units so that electrical connection between them is achieved merely by the proper insertion of the connection elements and electrical units in their respective recesses. Portions of the connection elements extend from the housing to define leads by means of which electrical connection to external circuitry is readily made. The electrical units are pressed into operative engagement with their respective connection elements by means of a conductive strip which is mounted on the housing by the insertion thereof into an opening in the housing, the strip preferably being frictionally or resiliently retained in that opening. The strip has individual portions which engage the electrical units in the recesses, thereby simultaneously retaining those units in position and making electrical connection therewith. External electrical connection is made to the conductive strip to complete the circuit, preferably by a conductive unit received in one of the recesses in the housing and by a recess-mounted connection element operatively associated with that conductive unit. This entire subassembly may be used as such, or, if desired, it may be inserted into a casing from which the lead portions of the connection elements extend, the subassembly being retained in that casing and the individual electrical units being there protected by means of a "potting" compound of appropriate composition.

To the accomplishment of the above, and to such other objects as may hereinafter appear, the present invention relates to a matrix for mounting and making electrical connection to a plurality of individual electrical units, as defined in the appended claims and as described in this specification, taken together with the accompanying drawings, in which:

Figure 1:
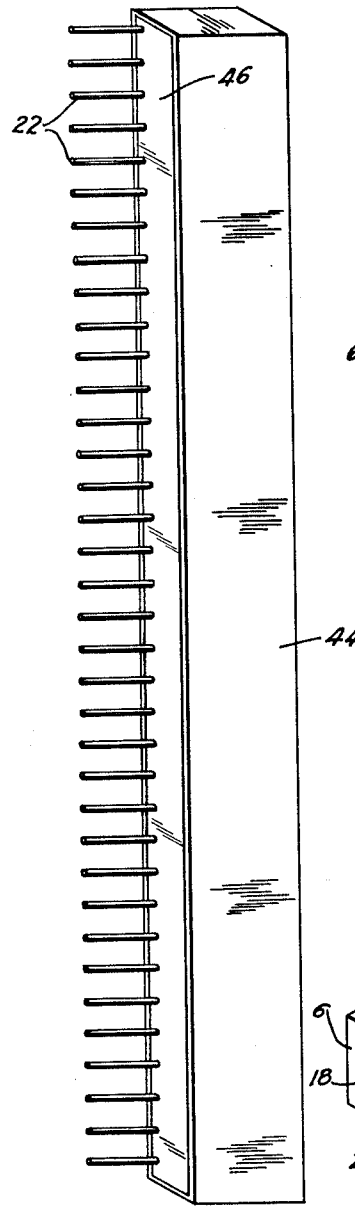
FIG. 1 is a three-quarter perspective view of one embodiment of the present invention, showing the subassembly contained within a casing which is substantially filled with a potting compound.

The assembly comprises a housing generally designated 2 formed of any suitable insulating material, such as a phenolic resin, which may be molded or machined to shape. The housing 2 is elongated in nature and comprises a front section 4 and a rear section 6, the front section 4 extending forwardly from the rear section 6 and the rear section 6 being higher than the front section 4. The front section 4 has, spaced along the length thereof, a plurality of recesses 8 of a size suitable for receiving the individual electrical units 10 with which it is adapted to be used, the tops of the recesses 8 being open and exposed forwardly of the rear housing section 6. Passages 12 extend forwardly from the recesses 8 to the front side wall 14 of the front housing section 4, the tops of those passages 12 also being open and exposed forwardly of the rear housing section 6. The rear housing section 6 is provided, at its forwardly exposed part 16, with an opening 18 extending thereinto.

The individual electrical connection elements, one of which is designed to be used in connection with each of the individual electrical units 10, comprise body portions 20 smaller than and individually receivable in the recesses 8, from which body portions 20, lead portions 22 extend, those lead portions being receivable in the passages 12 and having a length such as to extend out beyond the front side wall 14 of the front housing section 4. The connection elements 20, 22 may be formed from a single length of conductive wire bent into the form illustrated, the body portion 20 being wider than the lead portion 22 and comprising a substantially circularly bent length of the wire.

The conductive strip generally designated 24 is formed of any suitable conductive material and is preferably inherently resilient. Spring tempered beryllium copper is suitable for this purpose. Its body comprises a rear portion defined by panels 26 and 28 bent relative to one another along a line 30, and a front portion comprising individual parts or fingers generally designated 32, one for each recess 8, each of those fingers 32 comprising a rear portion 34 which may constitute an extension of the panel 28 and a front portion 36, the rear and front portions 34 and 36 being bent relative to one another along a line 38.

The individual electrical units 10 may be of any desired type, and are of a size such as to be individually receivable within the recesses 8 in the housing 2. For example, they may comprise individual selenium rectifier cells or pellets. The electrical units 10 are provided with opposed terminal portions or surfaces 40 and 42 located respectively at the bottom and top thereof when the units 10 are inserted into their respective housing recesses 8. It is, of course, by no means essential that all of the electrical units 10 be identical, nor even that they be of the same general character. It is one of the primary advantages of the structure of the instant invention that the nature of its use is extremely flexible. Indeed, as will be explained more fully below, it is preferred that one of the units 10 be completely conductive in nature, formed of a mass of aluminum or copper, in order to facilitate the making of external electrical connection to the conductive strip 24.

Assembly of the device is exceedingly simple. The individual connection elements 20, 22 are inserted into their respective recesses 8 and passages 12 via the open tops thereof. Since the body portions 20 of these connection elements are wider than the passages 12 they will assume their proper location, with their lead portions 22 extending out well beyond the housing 2. Next the individual electrical units 10 are inserted into the recesses 8 via the open tops thereof so that their bottom terminal portions 40 are oriented toward and operatively rest upon and make electrical connection with the body portion 20 of their respective connection elements.

Next the rear portion 26, 28 of the conductive strip 24 is slid into the opening 18 via the open front end thereof, the fingers 32 of that strip 24 engaging respectively with the upper terminal portions 42 of the electrical units 10. The strip 24 is pre-bent along the lines 30 and 38 so that its rear portion 26, 28 normally has a height greater than the height of the opening 18. As a result, when the strip 24 is in place its rear portion 26, 28 will be vertically compressed and the bends 38 of the fingers 32 will be resiliently forced against the upper terminal portions 42 of the individual electrical units 10. The reaction between the rear portion of the strip 24 and the opening 18 in which it is received will serve to frictionally and resiliently, and hence reliably, retain the strip 24 in position. The resilient downward pressure of the fingers 32 on the individual electrical units 10 which they respectively engage will reliably retain those units 10 within their respective recesses 8, will force the units 10 down into firm engagement with the body portions 20 of their respective connection elements 20, 22, thereby ensuring good electrical connection between the lower terminal surfaces 40 of the units 10 and the respective connection element body portions 20, and will also ensure good electrical connection between the fingers 32, and hence the strip 24 as a whole, and the top terminal portions 42 of the individual electrical units 10.

Figure 2:
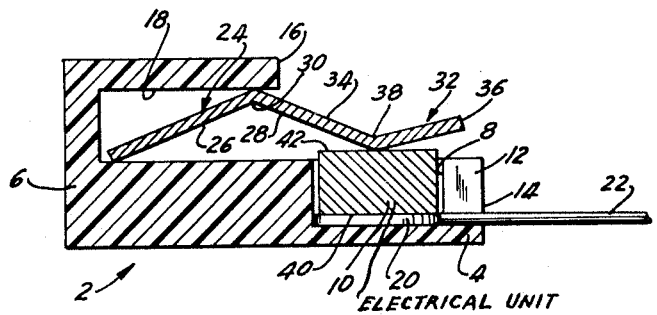
FIG. 2 is a cross sectional view of the subassembly comprising the housing, connection elements, individual electrical units, and conductive strip.
Figure 3:
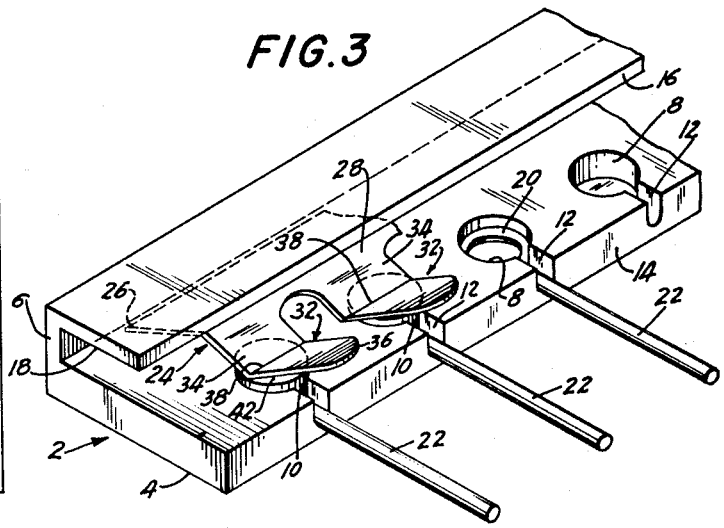
FIG. 3 is a fragmentary three-quarter perspective view of the subassembly of FIG. 2.

As shown in FIGS. 2 and 3 the top terminal portions 42 of the electrical units 10 extend above the upper surface of the front housing section 4. This is desirable, but not essential, provided that the engagement between the fingers 32 and the electrical units 10 is accomplished against resilient pressure.

It will be noted that the strip 24 constitutes a common connection to the top terminal portions 42 of the electrical units 10. External electrical connection to the strip 24, and hence to those top terminal portions 42, may be accomplished by positioning a conductive pellet in a selected one of the recesses 8, the lead portion 22 of the corresponding connection element extending from that recess being appropriately marked or indicated to facilitate the completion of proper external connection.

The subassembly as thus far described may be used as such, and in particular may be thoroughly tested in its assembled form, so that if any of the individual electrical units 10 are defective they may readily be replaced. For more permanent installations, or where protection against adverse external conditions is necessary or desirable, the entire subassembly may be inserted within a casing 44, with the lead portions 22 of the connection elements extending out therebeyond, after which a suitable encapsulating or "potting" material, such as an epoxy resin, designated in FIG. 1 by the reference numeral 46, may be poured into the casing 44 so as to cover the subassembly and substantially fill that casing, the lead portions 22 of the connection elements extending out beyond the potting material 46 so that electrical connection may be made thereto.

It will be apparent from the above description that the structure of the present invention is formed of a minimal number of simple and easily manufactured parts, none of which need be made to any high degree of dimensional accuracy, which parts may be assembled in a simple yet reliable manner, the very act of assembly ensuring that the individual electrical units 10 are properly and reliably mounted and have effective electrical connection made thereto. The matrix assembly involves the use of a limited number of standard parts which may be used in conjunction with individual electrical units 10 of different specific characteristics to form a wide variety of electrical networks.

While but a single embodiment of the present invention has been here disclosed, it will be apparent that many variations may be made relative thereto, all without departing from the spirit of the invention as defined in the following claims.

I claim:

1. An electrical assembly comprising a housing having a plurality of recesses exposed at their tops and having passages extending therefrom to a side wall of said housing, electrical connection elements in said recesses and having leads extending through said passages and beyond said side wall, individual electrical units in said recesses, said units having a pair of terminals one of which operatively engages and makes electrical connection respectively with its corresponding connection element, a conductive strip comprising a body mounted on said housing externally of said recesses and having portions overlying said recesses and engaging and making electrical contact with said other terminals of said units respectively, and means for making external electrical connection with said strip.

2. The assembly of claim 1, in which a portion of said housing is located to one side of and higher than said recesses and is provided with an opening, said body of said strip being received in said opening, thereby to mount said strip on said housing.

3. In the assembly of claim 2, said connection elements being below said electrical units in said recesses, means for resiliently urging said strip portions downwardly toward the interior of said recesses, thereby to urge said portions against said units and said units against said connection elements.

4. The assembly of claim 2, in which said conductive strip, including said strip portions, is resilient, said strip body resiliently engaging the interior of the opening in which it is received, thereby to retain said strip in mounted position, said connection elements being below said units in said recesses, and said strip portions being resiliently urged downwardly toward the interior of said recesses, thereby to urge said portions against said units and said units against said connection elements.

5. In the assembly of claim 1, said connection elements being below said electrical units in said recesses, means for resiliently urging said strip portions downwardly toward the interior of said recesses, thereby to urge said portions against said units and said units against said connection elements.

6. The assembly of claim 1, in which said means for making external electrical connection with said strip comprises a conductive unit in one of said recesses operatively engaged with the connection element in that recess and with the corresponding strip portion.

7. The assembly of claim 1, in which said passages are narrower than said recesses and are exposed at their tops.

8. In combination, a casing, the assembly of claim 1 being received therein, and potting material substantially filling said casing and said assembly, said leads extending out beyond said potting material.

9. An electrical assembly comprising an elongated housing having front and rear sections, the rear section being higher than the front section and having a forwardly exposed part, said front section having, spaced along the length thereof, a plurality of open-topped recesses with narrow open-topped passages extending from said recesses to the exterior of said front section, the forwardly exposed part of said rear section having an opening extending thereinto, a plurality of electrical connection elements comprising body portions received in and resting on the bottom of said recesses respectively and lead portions received in said passages respectively and extending outwardly beyond the exterior of said front section, a plurality of individual electrical units having terminals at the top and bottom thereof, said units being received in said recesses respectively with their bottom terminals oriented downwardly and operatively engaging the body portions of their associated connection elements respectively, and a conductive strip having a rear portion received within said opening in said rear housing section and having a front portion comprising parts overlying said recesses, means for resiliently urging said parts downwardly toward said recesses and into operative engagement with the respective top terminals of the electrical units received in said recesses, and means for making external electrical connection with said strip.

10. The assembly of claim 9, in which said conductive strip is resilient, its rear portion resiliently engages the interior of said opening in said rear housing section, and said means resiliently urging said parts of said front strip portion downwardly comprises the inherent resiliency of said strip.

11. The assembly of claim 10, in which said means for making external electrical connection with said strip comprises a conductive unit in one of said recesses operatively engaged with the connection element in that recess and with the corresponding part of said front portion of said conductive strip.

12. The assembly of claim 9, in which said means for making external electrical connection with said strip comprises a conductive unit in one of said recesses operatively engaged with the connection element in that recess and with the corresponding part of said front portion of said conductive strip.

13. In combination, a casing, the assembly of claim 9 being received therein, and potting material substantially filling said casing and said assembly, said leads extending out beyond said potting material.

References Cited in the file of this patent

UNITED STATES PATENTS

| | | |
|---|---|---|
| 2,684,457 | Lingel | July 20, 1954 |
| 2,787,735 | Scal | Apr. 2, 1957 |
| 2,864,057 | Connelly | Dec. 9, 1958 |
| 2,821,691 | Andre | Jan. 28, 1958 |